(12) United States Patent
Weber et al.

(10) Patent No.: US 8,961,348 B2
(45) Date of Patent: Feb. 24, 2015

(54) DRIVE AXLE HOUSING SYSTEM FOR REDUCING OIL CHURNING

(75) Inventors: Jason Weber, Peoria, IL (US); Dale C. Messmore, East Peoria, IL (US); John B. Salomon, Peoria, IL (US); Benjamin T. Nelson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 13/158,878

(22) Filed: Jun. 13, 2011

(65) Prior Publication Data

US 2012/0316024 A1 Dec. 13, 2012

(51) Int. Cl.
 F16H 57/04 (2010.01)
 F16H 48/08 (2006.01)
 F16H 48/22 (2006.01)
 F16H 48/32 (2012.01)

(52) U.S. Cl.
 CPC ........ *F16H 57/0409* (2013.01); *F16H 57/0447* (2013.01); *F16H 57/0483* (2013.01); *F16H 48/08* (2013.01); *F16H 48/22* (2013.01); *F16H 48/32* (2013.01)
 USPC ............ 475/160; 475/231; 74/607; 184/6.12; 184/13.1

(58) Field of Classification Search
 USPC ........... 475/160, 231; 74/607; 184/6.12, 13.1, 184/11.1
 See application file for complete search history.

(56) References Cited

U.S. PATENT DOCUMENTS

| | | | |
|---|---|---|---|
| 3,162,269 A * | 12/1964 | Reed .............................. | 184/6.12 |
| 4,560,056 A * | 12/1985 | Stockton .................. | 192/113.32 |
| 4,721,184 A | 1/1988 | Sowards | |
| 5,505,112 A | 4/1996 | Gee | |
| 5,558,591 A | 9/1996 | Erickson et al. | |
| 5,584,773 A * | 12/1996 | Kershaw et al. .............. | 475/160 |
| 5,976,050 A | 11/1999 | Irwin | |
| 6,299,561 B1 * | 10/2001 | Kramer et al. ................ | 475/160 |
| 6,938,731 B2 | 9/2005 | Slesinski | |
| 7,445,574 B2 | 11/2008 | Weith | |
| 7,461,720 B2 | 12/2008 | Min | |
| 7,465,158 B2 | 12/2008 | Weston | |
| 8,152,675 B2 * | 4/2012 | Altvaten et al. ............... | 475/160 |
| 2006/0048600 A1 * | 3/2006 | Taguchi et al. ................. | 74/607 |
| 2007/0251348 A1 | 11/2007 | Hayes et al. | |
| 2009/0176614 A1 * | 7/2009 | Hilker et al. .................. | 475/160 |
| 2010/0009800 A1 * | 1/2010 | Altvaten et al. ............... | 475/160 |

FOREIGN PATENT DOCUMENTS

| | | |
|---|---|---|
| DE | 4338216 | 5/1995 |
| EP | 1591694 | 11/2005 |
| JP | 2003-254415 | 9/2003 |

* cited by examiner

*Primary Examiner* — Gene Crawford
*Assistant Examiner* — Terry Chau
(74) *Attorney, Agent, or Firm* — Miller, Matthias & Hull

(57) ABSTRACT

A drive axle housing system may minimize churning of splash and spray oil within a drive axle housing. The drive axle housing system includes apparatus for incorporation into the axle, the apparatus including an oil churning reduction member that may be affixed to the interior walls of the axle housing. The oil churning reduction member includes interior surfaces adapted to closely align with interior moving gear components of the axle to minimize efficiency losses due to oil movement. The system may also incorporate an annular element, affixed to the axle housing and closely aligned with the backside of a ring gear component of the differential axle. The combined use of the member and the element may substantially reduce torque losses attributable to excessive churning of oil.

18 Claims, 6 Drawing Sheets

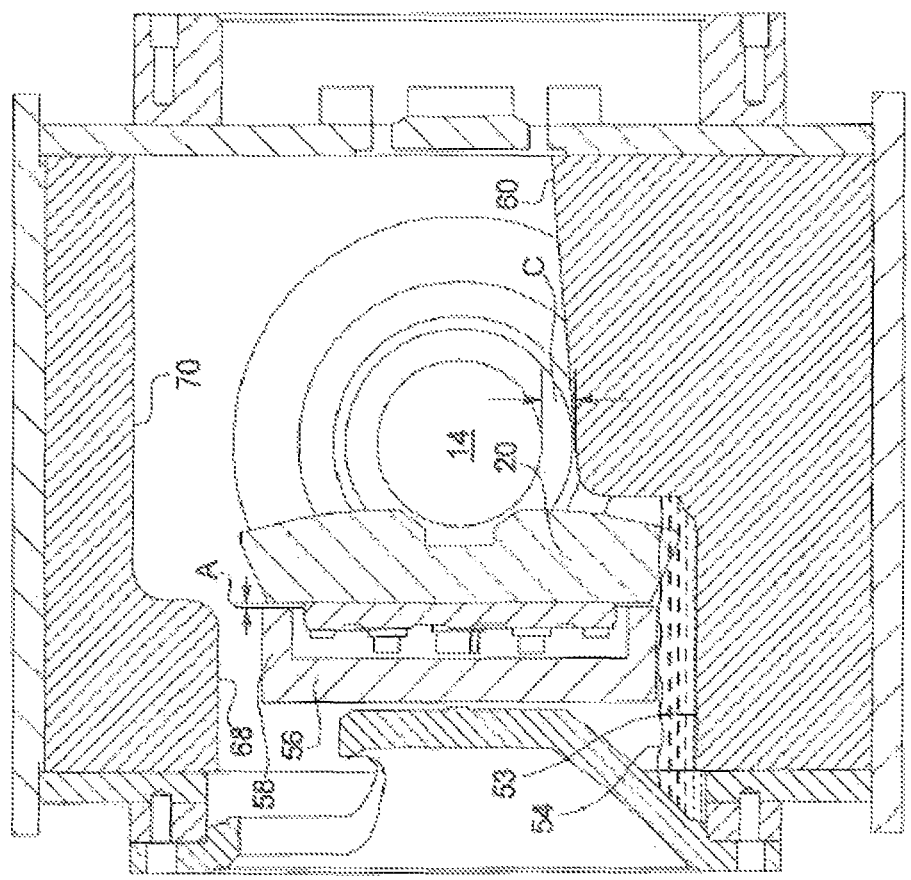

DRIVE AXLE HOUSING SYSTEM FOR REDUCING OIL CHURNING

TECHNICAL FIELD

The present disclosure generally relates to lubrication of geared final drive axles and, more particularly, to apparatus for reducing efficiency losses associated with gear-induced churning of splash and spray oil.

BACKGROUND

Drive axles are commonly used in motorized platforms of all types, including trucks, buses, and automobiles, as well as off-road machines utilized in construction, mining, and agricultural fields. Typically, drive axles employ beveled differential gear structures for splitting driveline torque between dual opposed final drive half shafts. Such splitting avoids undue stresses on drivetrain components, and avoids excessive skidding and wear of powered driving tires as a vehicle turns about a radius.

Drive axle systems are traditionally lubricated by so-called "splash and spray" oil; that is, oil contained within a nonrotating reservoir is picked up and sprayed about the interior of the housing by at least one rotating gear structure that interfaces with the reservoir. Of course, the lubrication is required to achieve satisfactory operation of the drive axles and to avoid premature failures of associated operating components due to oil starvation, as will be appreciated by those skilled in the art.

Although beneficial to meet requisite lubrication demands, one deleterious side effect of splash and spray oil is a loss of torque resulting from efficiency losses created by churning of the oil. Various structures and methods have been utilized to reduce the churning beyond amounts determined necessary to assure effective lubrication. Typical apparatus and techniques have involved uses of interior ducting, shrouds, and baffles to channel and/or redirect the oil to specific regions within the housing to reduce efficiency losses. Others have involved use of inserts strategically positioned to physically displace excess oil within the lubricant reservoir. Although some of these approaches have had modest successes, none have substantially reduced churning losses. To the extent that such losses translate directly into operational expense, i.e. fuel costs, significant motivation remains to further reduce churning losses.

SUMMARY OF THE DISCLOSURE

In accordance with a first aspect of the disclosure, an oil churning reduction member may be employed to geometrically reshape the interior of a typical axle housing into one that optimally reduces oil churning. The interior configuration of the member may be shaped and sized to closely control spacing between interior surfaces of the member and various gear components rotating inside the housing. The member, circumferentially fixed in place about the interior wall of the housing, can thereby be designed to minimize churning losses within the differential housing environment.

In accordance with a second aspect of the disclosure, a separate non-rotatable annular element may be positioned in close proximity to the non-meshing or backside of the ring gear. The element may be effective to further reduce churning losses in and about the immediate vicinity of the rotating ring gear.

A third aspect of the disclosure may be the combined effectiveness of the oil churning reduction member and the annular ring element to reduce typical churning losses by up to 50%.

BRIEF DESCRIPTION OF THE DRAWINGS

FIG. 5 is a front cross-sectional view of the drive axle housing system, taken along lines 5-5 of FIG. 1;

DETAILED DESCRIPTION

Figure 1:
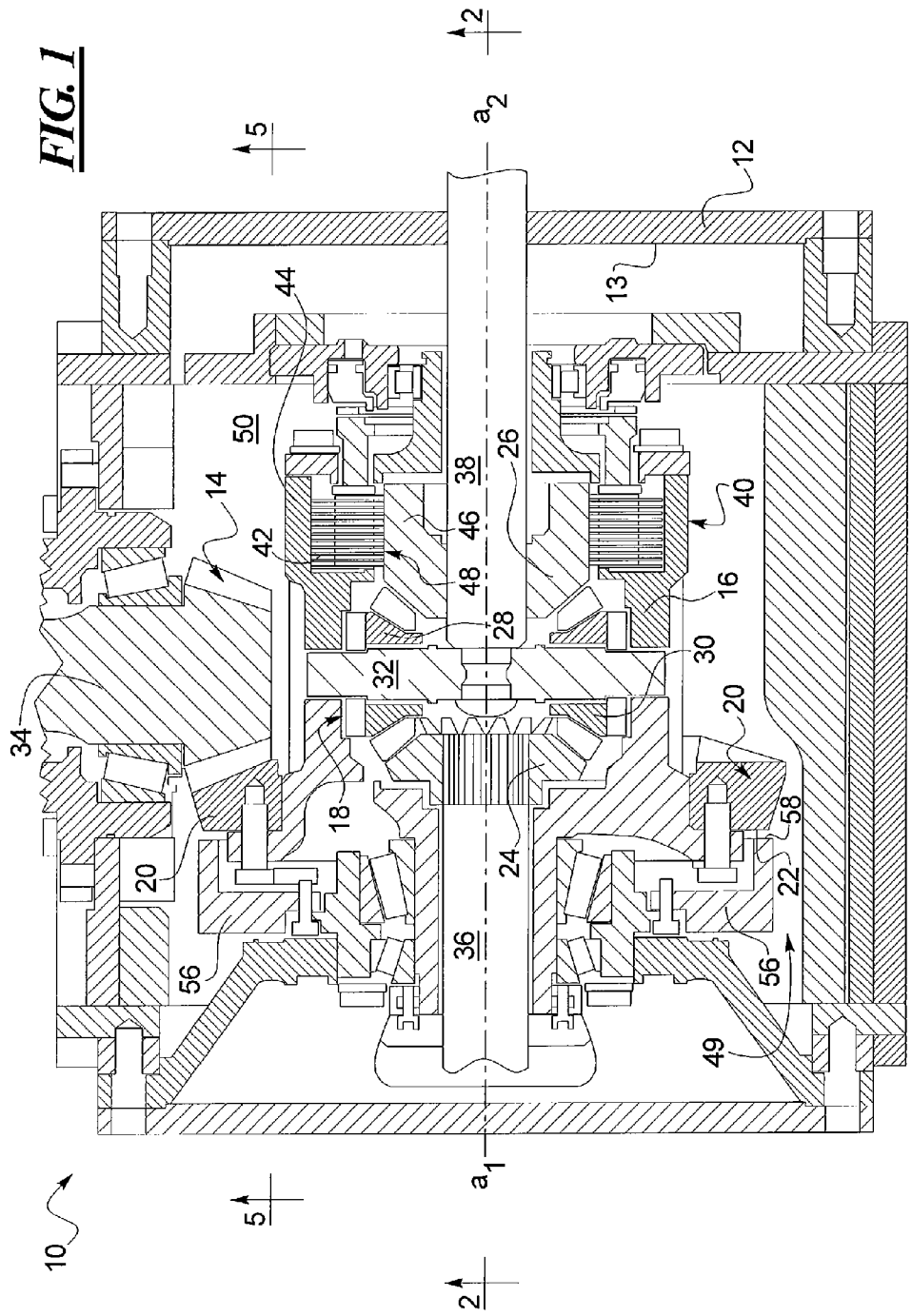
FIG. 1 is a top cross-sectional view of a drive axle housing system incorporating features constructed in accordance with the teachings of this disclosure.
Figure 2:
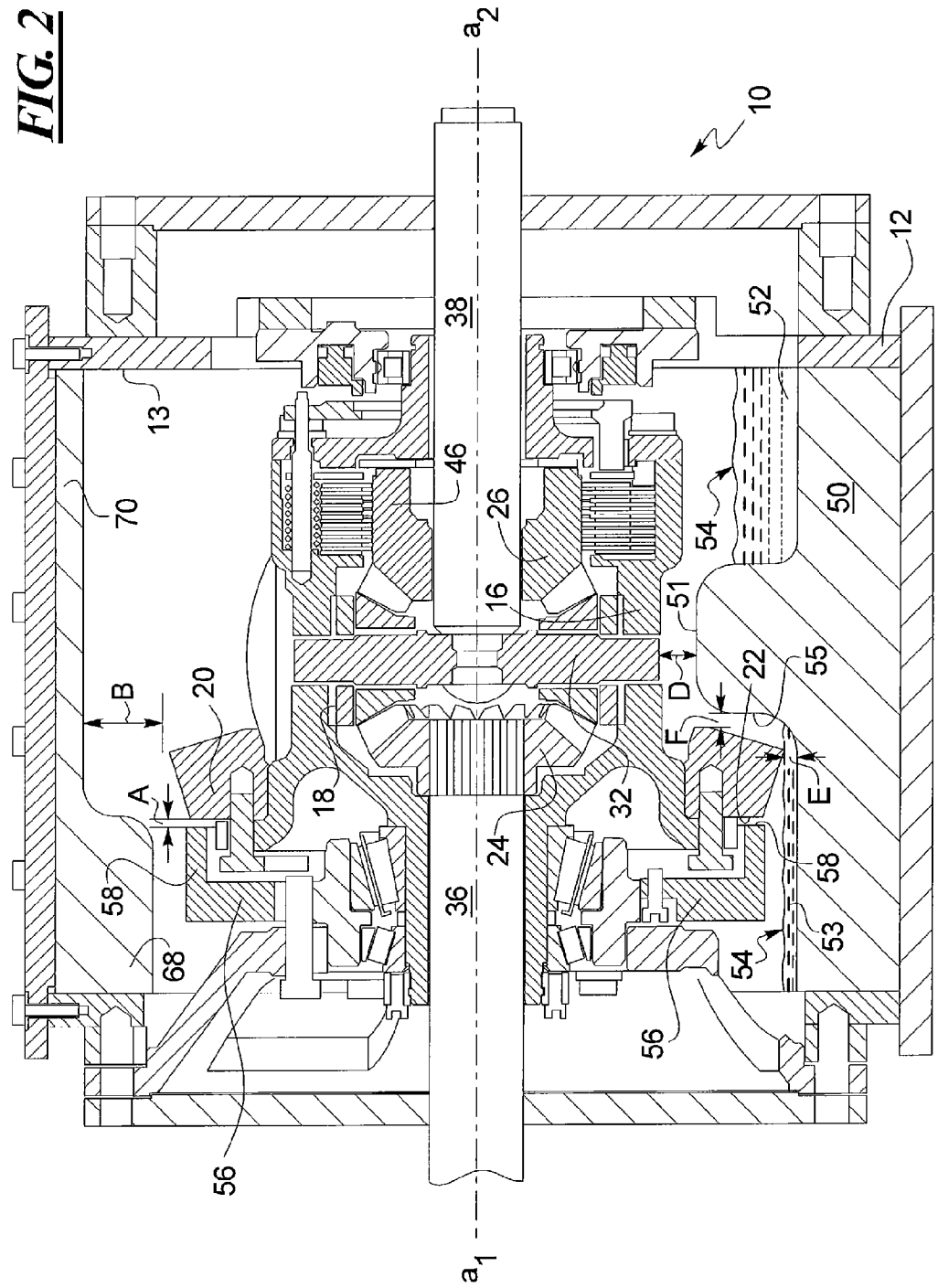
FIG. 2 is a cross-sectional rear elevation view of the drive axle housing system of FIG. 1, as viewed along lines 2-2 thereof.

A first embodiment of the disclosure is depicted in FIGS. 1 through 6. Referring initially to FIGS. 1 and 2, a final drive axle 10, also variously referred to as a differential axle system, is shown in top and rear cross-sectional cutaway views, respectively. The drive axle 10 includes a housing 12 containing a beveled drive pinion gear 14 that rotates a differential carrier 16 via a pinion-driven beveled ring gear 20 affixed to the carrier 16. The carrier 16 incorporates a differential gear set 18 that includes a pair of left and right side gears 24 and 26, respectively, which engage a pair of spider gears 28 and 30 splined to a spider shaft 32, as shown.

Those skilled in the art will appreciate that the pinion gear 14 extends from a pinion gear shaft 34, and effectively engages the differential carrier 16 via the ring gear 20 to split torque between side gears 24 and 26. Since the side gears, which extend along axis $a_1$-$a_2$ as shown, are respectively splined to left and right half shafts 36 and 38 to which powered vehicular driving wheels (not shown) may be affixed, it will be appreciated that the described structure assures that torque from an engine or prime mover (neither shown) is split between at least a pair of driving wheels, in a typical differentially geared manner.

Also incorporated within the axle drive 10 is a wet disc brake assembly 40, defined by a set of interleaved discs 42 and 44. The brake assembly 40 circumferentially surrounds the right half axle 38. Discs 42 are axially splined to a fixed outer brake sleeve 44. Discs 48 are rotatable relative to discs 42, as the latter are splined to an inner brake hub 46 adapted to rotate within the sleeve 44.

The foregoing structure details the environment in which disclosed drive axle housing system 49 may be designed and adapted to operate. For example, such a drive axle housing system may be advantageously utilized as part of a transmission or differential axle forming part of a work machine, including but not limited to a truck, track-type tractor, road grader, pipe layer, roller, forestry machine, or other industrial vehicle used in construction, mining, or agriculture.

Figure 4:
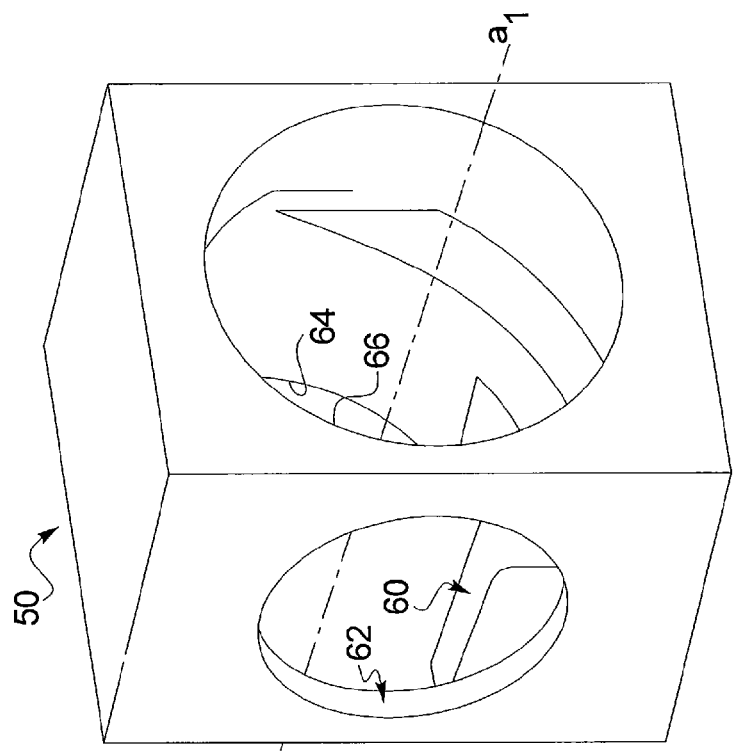
FIG. 4 is a perspective view of the embodiment of FIG. 3, albeit with reversed orientation to depict opposite sides thereof.
Figure 3:
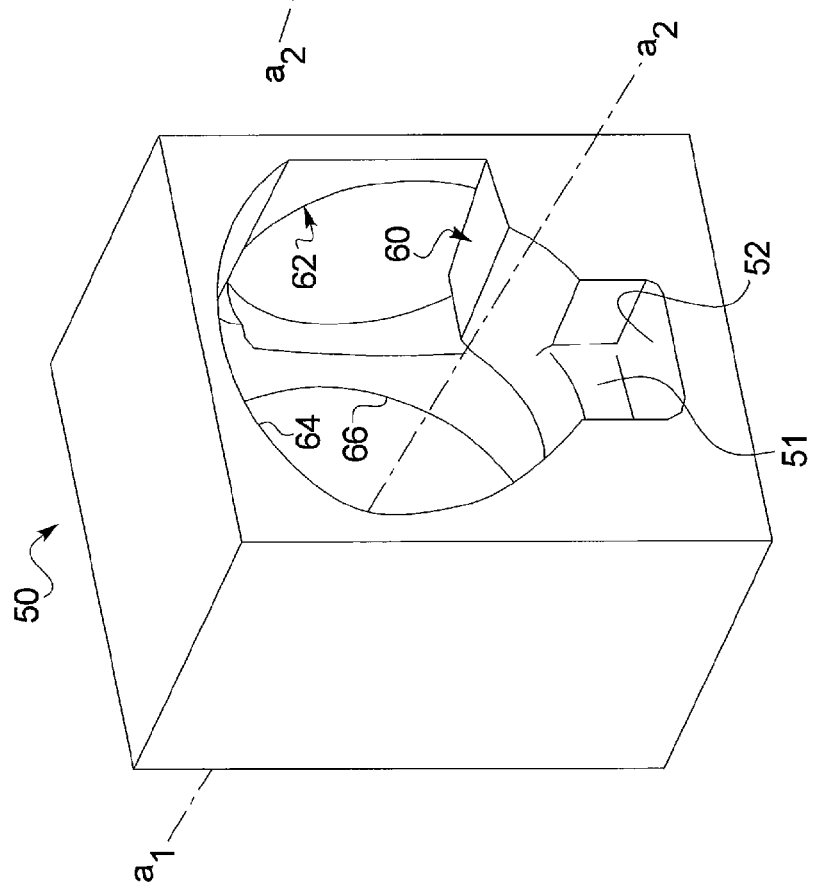
FIG. 3 is a perspective view of a first embodiment of an oil churning reduction member incorporating features constructed in accordance with the teachings of this disclosure.

As earlier noted, FIGS. 3 and 4 display a first embodiment of an oil churning reduction member 50 in reversely oriented views. Thus, it will be noted that the orientations of axis $a_1$-$a_2$, along which extend side gears 24, 26 and half shafts 36, 38, are physically reversed in the respective views to reveal two distinct perspectives of the member 50. Having a box-shaped exterior that may be readily fixed to and encased within a correspondingly sized and shaped interior of the differential housing 12, the member 50 includes interior arcuate surfaces that may be proportioned and adapted to closely surround various differential gear components at specific spacial dimensions. The arcuate surfaces within the reduction member 50 may work together to effectively reduce churning of oil produced by rotation of the ring gear 20 through the volume of splash and spray lubricating oil 54 contained within one of two oil reservoirs 52 and 53 of the member 50.

Referring momentarily back to FIG. 2, the bottom of the member 50 contains a pair of oil reservoirs, a catch basin reservoir 52 and a so-called "dynamically optimized" reservoir 53, the latter adapted to contain a relatively limited oil volume in comparison to a typical ring gear-side reservoir. The limited or reduced oil volume acts to reduce the amount of churning that would otherwise be created by the ring gear 20.

The catch basin reservoir 52 collects splash and spray oil upon its gravity-fed return to the reservoir 52, after the oil has been distributed to the various moving internal components contained within the housing 12. A medially positioned reservoir separator 51 may protrude upwardly from respective floors of the two reservoirs 52 and 53, and may act as a dam between the two reservoirs. The level of oil in the catch basin reservoir 52 will generally be higher than the desirably lower level of oil contained in the dynamically optimized reservoir 53.

Within the described environment, the separator 51 may be effective to assure that the amount of splash and spray oil being picked up by the ring gear 20 from the reservoir 53 can be "optimized" to be sufficient but not excessive. The member 50 may also be designed to closely surround the differential carrier 16, as best shown in FIG. 2, where gap D is displayed as the radial distance between the medial portion 51 and the differential carrier 16.

Referring now to FIG. 5, a pinion ramp 60 may be proximally positioned, by a distance specifically displayed as gap C, with respect to the beveled pinion gear 14. The ramp 60 may be angled or sloped downwardly as shown to facilitate the return of splash and spray drive axle housing oil to the catch basin reservoir 52. The element 50 may also incorporate a pinion gear access opening 62, as well as access openings 64 and 66, through which may extend right and left half shafts 38 and 36, respectively. FIGS. 2 and 5 reveal a left side disposed radially inner top wall portion 68 of element 50 which may be spaced relatively close to the ring gear 20 as compared to the right side disposed radially outer top wall portion 70 of element 50. The portion 70 is spaced a relatively much greater distance from the differential carrier 16.

Figure 6:
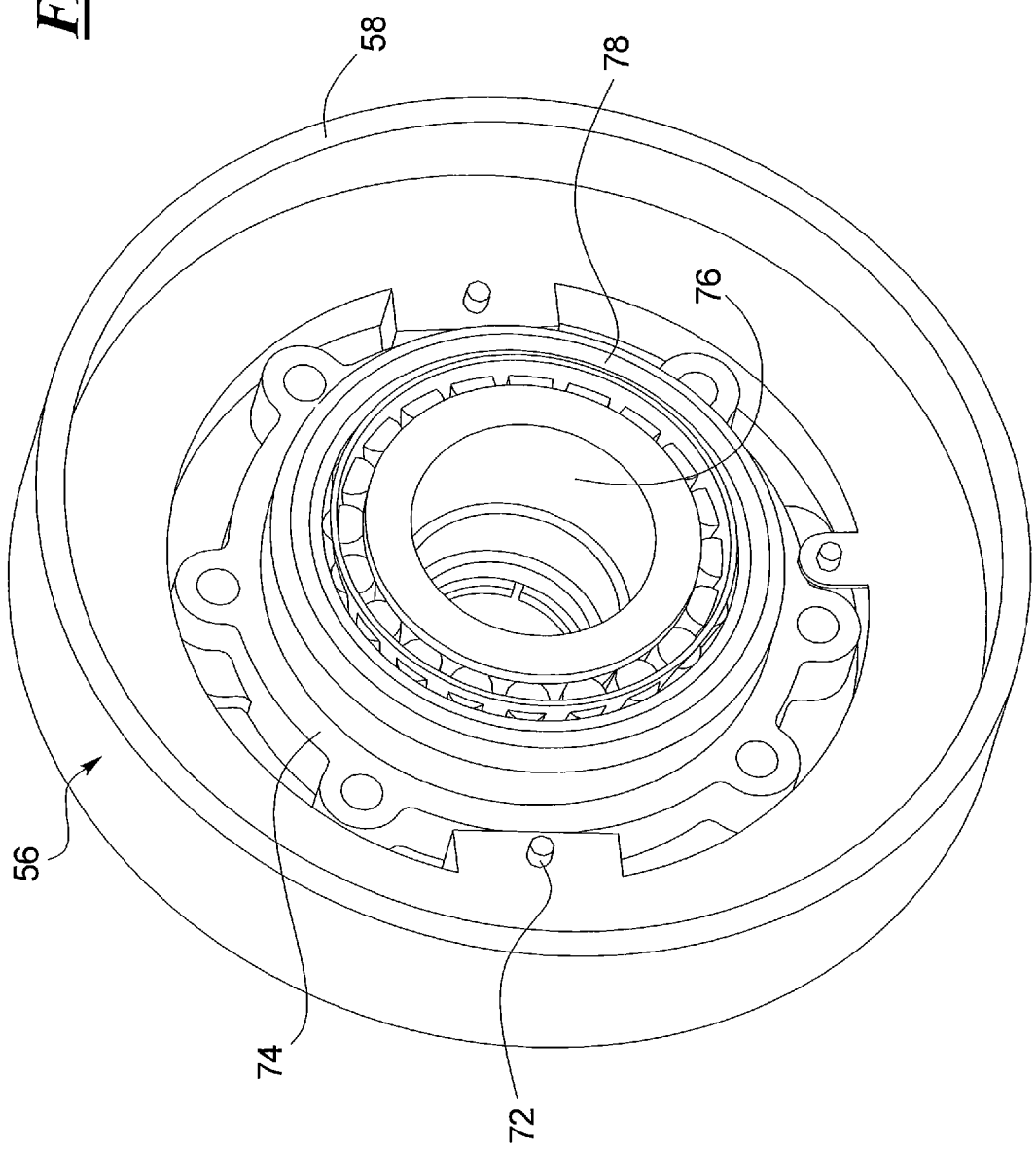
FIG. 6 is a perspective view of an embodiment of an annular element incorporating features constructed in accordance with the teaching of this disclosure.

Referring now to FIG. 6, an annular element 56 having a flanged portion 58 may be secured as by bolts 72 to the non-rotatable outer bearing cage 74 of the ring gear bearing 78. The ring gear 20 is supported on, and rotates with, the inner rotatable bearing cage 76 of the ring gear bearing 78. The annular element 56 may be non-rotatably fixed with respect to, and positioned in close proximity to, the backside 22 (FIG. 2) of the rotatable ring gear 20. The annular element 56 may be spaced from the backside 22 by a gap or distance A. The distance A (FIG. 2) of approximately 5.0 to 7.0 millimeters (mm), a variable distance as measured between flanged and unflanged portions, may be advantageous for reducing oil churning losses. Moreover, a distance B between the ring gear 20 and the radially outer top wall portion 70 ranges from 53 to 57 mm, a distance C between the pinion ramp 60 and the pinion gear 14 of about 2.5 mm, a distance D between the medial portion 51 of the member 50 and the differential carrier 16 ranging between 3 to 12 mm, a distance E between the floor of the dynamically optimized reservoir 53 and the ring gear 20 of approximately 5 to 12 mm, and an axial distance F between the ring gear 20 and an adjacent vertical wall 55 of the medial portion 51, ranging between 3 and 9 mm, all contribute to the reduction of churning losses.

With respect to a frame of reference for the foregoing listed dimensions between the variously described components, the dimensions may be primarily a function of the oil viscosity and the ring gear rotating speeds, as opposed to the relative component sizes or dimensions of the axle housing per se. Thus, the stated dimensions may, in the described embodiment, be generally associated with transmission and gearbox oil viscosity grades ranging between 20 and 50 SAE, and for ring gear speeds ranging up to 4000 RPM.

Those skilled in the art will appreciate that the structure of the described drive axle housing system 49 may be comprised primarily of the member 50 and the element 56. In combination, the member 50 and element 56 may be effective to reduce axle churning losses by 30 to 50%, thus providing significant potential improvement over existing channeling, shrouding, and baffles designed to redirect splash and spray oil flows within existing drive axle systems.

More specifically, the element 50 and its spacing relationships with respect to the internal components of the differential gear axle may be effective to achieve 70% of the overall reduction in friction losses associated with churning. On the other hand, the annular element 56, nonrotatably fixed to the housing, and situated a relatively small spatial distance of distance A from the backside 22 of the ring gear 20, maybe effective to achieve the remaining approximately 30% of the total 30 to 50% churning loss reduction.

In creating the drive axle housing system 49, a summation parametric, herein referred to as a Weber summation, $\Sigma_W$, may be employed to achieve the noted churning reduction levels described herein and heretofore unknown. More specifically, the Weber summation may hereby be defined as:

$\Sigma_W A+B+C+D+E+F$, where:

A is the described spacing or distance between the above identified backside 22 of the ring gear 20 and the annular element 56;

B is the described distance between the ring gear 20 and the radially outer top wall portion 70;

C is the described distance between the pinion ramp 60 and the pinion gear 14;

D is the described distance between the medial portion 51 of the member 50 and the differential carrier 16;

E is the described distance between the floor 53 of the reservoir 52 and the ring gear 20; and F is the described axial distance between the ring gear 20 and the medial reservoir separator portion 51, 51'.

In accordance with the above-described calculation, if a drive axle housing system 49 is manufactured having a described Weber summation value of between 71 and 100 millimeters, a reduction of up to 50% in churning losses may be achieved.

This first described embodiment defines the member 50 as being formed separately of an axle housing 12, and installed as a separate component about the interior thereof. By way of example only, the member 50 may be formed as a stamped metallic insert, or of an injection molded plastic such as a polymer plastic adapted for accommodating thermal cycling and adequate to survive the corrosive effects of lubricating oil. Alternatively, the member 50 may be integrally formed with, i.e. die cast as part of, the housing 12, so as to incorporate the desired internal configurations of the disclosed separate member 50. In case of the latter, the exterior of the housing could be substantially of the same shape as the interior so as to avoid any unnecessary weight.

Those skilled in the art will appreciate that splash and spray oil generated within the member 50 is also designed to lubricate right and left half shafts 64 and 66, as well as the pinion gear 14 and its associated shaft 34.

Figure 7:
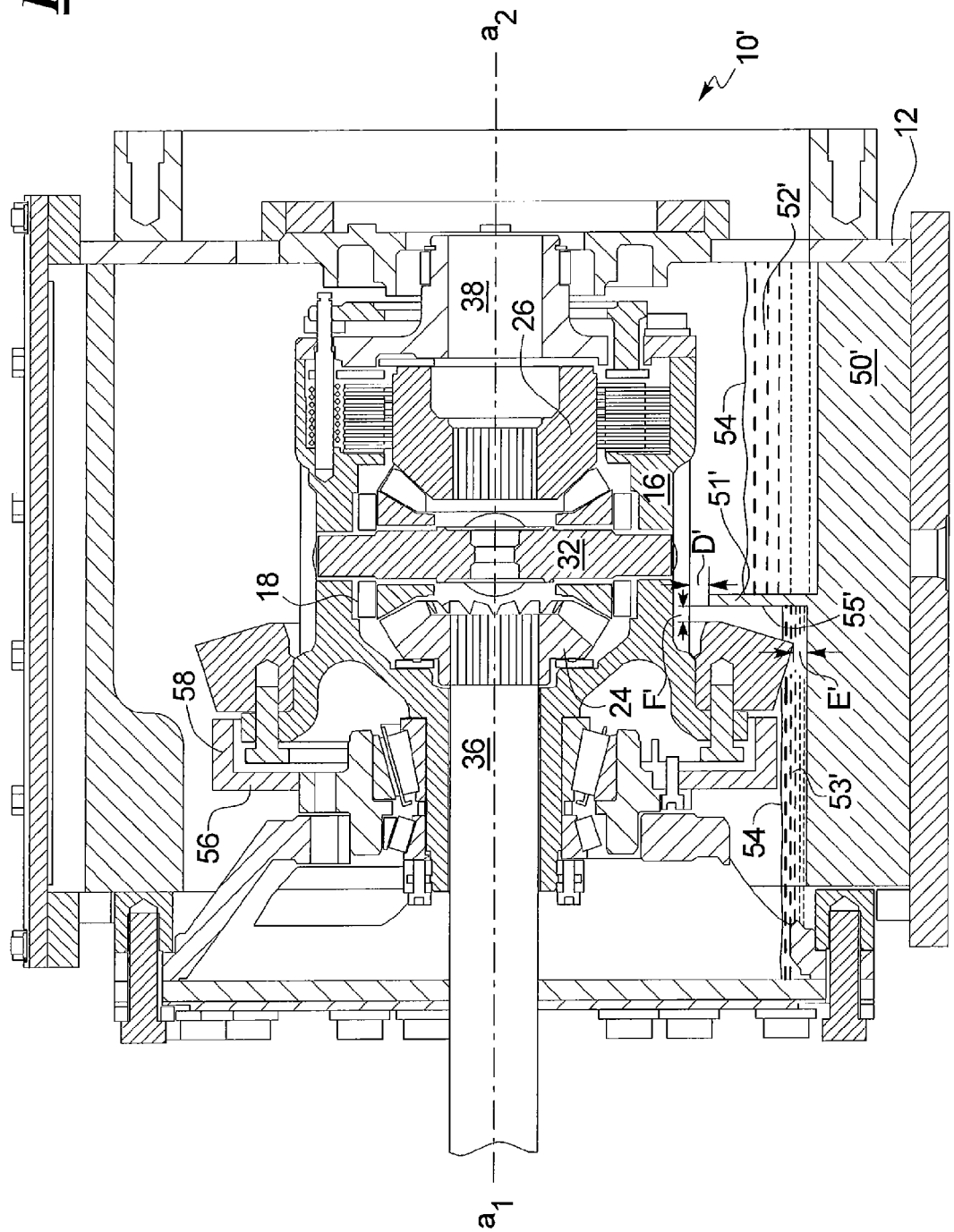
FIG. 7 is a view of an alternative embodiment of the disclosed drive axle housing system, shown in a cross-sectional view analogous to that of FIG. 2, incorporating features constructed in accordance with the teachings of this disclosure.

A second embodiment of an oil churning reduction member 50' is shown in FIG. 7. A difference between the second embodiment 50' and the first embodiment 50, as best shown in FIG. 2, is the use of a thin walled baffle 51' instead of the wider dam-style medial reservoir separator 51. All other aspects of the two embodiments remain unchanged. The second embodiment 51' displays a gap D' in FIG. 7 that is analogous to gap D as shown in FIG. 2. Moreover, the gap F' of FIG. 7 is analogous to the gap F of FIG. 2. The performance parameters of the respective medial reservoir separator members 51 and 51' have been determined to be equivalent. The use of one over the other may be determined from criteria relating to ease of manufacturing; thus by way of example, a cast structure may lend itself more readily to use of a dam-style separator member over the baffles-style separator member for reasons of structural rigidity, among others.

INDUSTRIAL APPLICABILITY

In general, technology disclosed herein has industrial applicability in a variety of settings such as, but not limited to, improving operating efficiencies of differential axles by minimizing torque losses associated with churning of splash and spray oil. Its industrial applicability extends to virtually all motorized transport platforms, including automobiles, buses, trucks, tractors, industrial work machines and most off-road machines utilized in agriculture, mining, and construction.

The disclosed drive axle housing system may offer improved control of the splash and spray oil necessary for lubrication of various moving parts within the axle housing, including the ring and pinion gears. Among other attributes, the system of the present disclosure may find applicability in reducing unnecessary amounts of oil in the proximity of the rotating ring and pinion gears, resulting in reduction in churning loss, and thus promoting enhanced operational efficiency including lower fuel requirements.

The features disclosed herein may be particularly beneficial to wheel loaders and other earth moving, construction, mining or material handling vehicles that utilize gear sets adapted for splash and spray oil lubrication within axle housings.

What is claimed is:

1. A differential axle system comprising:
a housing containing a pinion gear, a ring gear, a first oil reservoir, and a second oil reservoir, the ring gear configured to be driven by the pinion gear and rotate through a volume of oil contained within the second oil reservoir;
a reservoir separator at a floor of the housing, the reservoir separator protruding upwardly and configured to act as a dam separating the first oil reservoir from the second oil reservoir such that the second oil reservoir is configured to contain a lower level of oil than the first oil reservoir; and
wherein the reservoir separator is configured to create a barrier with no holes and prevent the passage of oil between the first oil reservoir and the second oil reservoir through the reservoir separator and;
wherein the reservoir separator includes a pinion ramp positioned below the pinion gear, wherein the pinion ramp is downwardly sloped toward the second oil reservoir and configured to provide a gravity fed return of oil to the second oil reservoir.

2. The differential axle system of claim 1, further comprising a differential carrier rotatably mounted within the housing and configured to be rotated by the ring gear.

3. The differential axle system of claim 2, wherein the reservoir separator is arcuate and medially positioned within the housing to surround the differential carrier at the floor of the housing.

4. The drive axle housing system of claim 3, wherein the differential carrier includes a differential gear set that contains at least two spider gears and two opposed side gears, the spider and the two opposed side gears being in meshed engagement, and wherein the two opposed side gears are affixed directly to final drive half shafts, wherein the final drive half shafts and the ring gear define an axis through the housing.

5. The differential axle system of claim 3, wherein the reservoir separator is separated from the differential carrier by a gap, the gap between the reservoir separator and the differential carrier measuring a radial distance of between 3 millimeters and 12 millimeters.

6. The differential axle system of claim 5, wherein the pinion ramp is separated from the pinion gear by a gap, the gap between the pinion ramp and the pinion gear measuring a distance of about 2.5 millimeters.

7. The differential axle system of claim 3, wherein the reservoir separator comprises a thin-walled baffle.

8. A drive axle housing system for reducing gear oil churning losses comprising:
a differential axle including a housing having a pinion gear and a differential carrier rotatably mounted within the housing, the differential carrier including a differential gear set and a pinion-driven ring gear affixed to the differential carrier for rotation therewith;
an oil churning reduction member within the interior of the housing, the oil churning reduction member including interior surfaces positioned circumferentially about the differential carrier and the ring gear, the oil churning reduction member including a reservoir separator at a floor of the housing configured to create a first oil reservoir and a second oil reservoir proximate the ring gear such that the second oil reservoir contains a lower level of oil than the first oil reservoir and wherein the reservoir separator is configured to create a barrier with no holes and prevent the passage of oil between the first oil reservoir and the second oil reservoir through the reservoir separator;
the oil churning reduction member including an inner top wall portion and an outer top wall portion, the inner top wall portion positioned proximate to a back side of the ring gear and spaced radially inwardly with respect to the outer top wall portion of the oil churning reduction member; and
wherein the oil churning reduction member further includes a pinion ramp positioned below the pinion gear, wherein the pinion ramp is downwardly sloped toward the second oil reservoir and configured to provide a gravity fed return of oil to the second oil reservoir.

9. The drive axle housing system of claim 8, wherein the reservoir separator is medially positioned and surrounds the differential carrier at the floor of the housing.

10. The drive axle housing system of claim 9, wherein the differential carrier including the differential gear set contains at least two spider gears and two opposed side gears, the at least two spider and the two opposed side gears being in meshed engagement, and wherein the two opposed side gears are affixed directly to final drive half shafts, wherein the final drive half shafts and the ring gear define an axis through the housing, and wherein the oil churning reduction member is circumferentially disposed about the axis.

11. The drive axle housing system of claim 9, wherein the oil churning reduction member is integrally formed as a part of the housing.

12. The drive axle housing system of claim 11, wherein the oil churning reduction member is integrally formed as a die cast part of the housing.

13. The drive axle housing system of claim 9, wherein the reservoir separator comprises a thin-walled baffle.

14. The drive axle housing system of claim 9, wherein the reservoir separator is separated from the differential carrier by a gap, the gap between the reservoir separator and the differential carrier measuring a radial distance of between 3 millimeters and 12 millimeters.

15. A differential axle system comprising:
a housing containing a pinion gear, a ring gear, a first oil reservoir, and a second oil reservoir, the ring gear configured to be driven by the pinion gear and rotate through a volume of oil contained within the second oil reservoir;
an oil churning reduction member within an interior of said housing, the oil churning reduction member including a reservoir separator at a floor of the housing, the reservoir separator protruding upwardly and configured to act as a dam separating the first oil reservoir from the second oil reservoir such that the second oil reservoir is configured to contain a lower level of oil than the first oil reservoir, wherein the reservoir separator is configured to create a barrier with no holes and prevent the passage of oil between the first oil reservoir and the second oil reservoir through the reservoir separator;
the oil churning reduction member including an inner top wall portion and an outer top wall portion, the inner top wall portion positioned proximate to a back side of the ring gear and spaced radially inwardly with respect to the outer top wall portion of the oil churning reduction member; and
the oil churning reduction member including a pinion ramp positioned below the pinion gear, wherein the pinion ramp is downwardly sloped toward the second oil reservoir and configured to provide a gravity fed return of oil to the second oil reservoir.

16. The differential axle system of claim 15, wherein the oil churning reduction member is integrally formed as a cast part of the housing.

17. The differential axle system of claim 16, further comprising a differential carrier rotatably mounted within the housing and configured to be rotated by the ring gear, the differential carrier including opposed side gears are affixed directly to final drive half shafts, wherein the final drive half shafts and the ring gear define an axis through the housing, wherein the oil churning reduction member is circumferentially disposed about the axis, and wherein the reservoir separator is arcuate and medially positioned within the housing to surround the differential carrier at the floor of the housing.

18. The differential axle system of claim 17, wherein the reservoir separator comprises a thin-walled baffle.

* * * * *